United States Patent
Carlson et al.

[11] Patent Number: 6,125,000
[45] Date of Patent: Sep. 26, 2000

[54] DISK DRIVE SEEK CONTROL SYSTEM UTILIZING PREDICTED MOTION PARAMETER AND DYNAMIC TRAJECTORY ALIGNMENT

[75] Inventors: Lance R. Carlson; Mark Birtzer; Larry Hutsell, all of Longmont, Colo.

[73] Assignee: Maxtor Corporation, Longmont, Colo.

[21] Appl. No.: 08/650,977

[22] Filed: May 21, 1996

[51] Int. Cl.[7] .................................. G11B 5/596
[52] U.S. Cl. ........................ 360/78.08; 360/78.04
[58] Field of Search ........................ 360/75, 78.06, 360/78.08, 78.09, 77.01

[56] References Cited

U.S. PATENT DOCUMENTS

| | | | |
|---|---|---|---|
| 4,697,127 | 9/1987 | Stich et al. | 318/561 |
| 4,924,160 | 5/1990 | Tung | 318/561 |
| 4,940,924 | 7/1990 | Mizuno et al. | 360/78.04 |
| 5,119,250 | 6/1992 | Green et al. | 360/78.09 X |
| 5,150,266 | 9/1992 | Albert | 360/78.04 |
| 5,151,639 | 9/1992 | Hasegawa et al. | 360/78.09 X |
| 5,182,684 | 1/1993 | Thomas et al. | 360/78.09 |
| 5,189,571 | 2/1993 | Murphy et al. | 360/75 |
| 5,255,136 | 10/1993 | Machado et al. | 360/77.05 X |
| 5,345,348 | 9/1994 | Suzuki | 360/78.04 X |
| 5,381,282 | 1/1995 | Arai et al. | 360/78.09 |
| 5,396,379 | 3/1995 | Mayo | 360/78.07 |
| 5,402,400 | 3/1995 | Hamada et al. | 369/32 |
| 5,459,624 | 10/1995 | Erickson et al. | 360/77.02 |
| 5,465,034 | 11/1995 | Andrews, Jr. et al. | 360/78.06 X |
| 5,469,414 | 11/1995 | Okamura | 369/32 |
| 5,475,545 | 12/1995 | Hampshire et al. | 360/78.06 |
| 5,550,685 | 8/1996 | Drouin | 360/77.04 X |
| 5,576,909 | 11/1996 | Dierkes et al. | 360/78.09 |
| 5,585,976 | 12/1996 | Pham | 360/77.4 |
| 5,677,809 | 10/1997 | Kadlec | 360/78.09 |
| 5,708,581 | 1/1998 | Martinez | 360/77.04 X |

*Primary Examiner*—Paul Loomis
*Assistant Examiner*—K. Wong
*Attorney, Agent, or Firm*—Sheridan Ross P.C.

[57] ABSTRACT

The present invention relates to a disk drive seek control system which is capable of rapidly moving a transducer from an initial position to a target position above a data storage medium. The system applies control to an actuator motor means based on projected transducer velocity at a future servo sample time rather than velocity at a previous servo sample time. This allows the system to significantly reduce transducer velocity errors relative to a desired velocity profile. In addition, the system utilizes dynamically adapted feed forward deceleration current during a deceleration portion of the seek cycle to further reduce velocity errors during this period. By reducing velocity error during the seek cycle, the system significantly reduces the length of time required for settling the transducer on the target track of the disk after the seek cycle has ended.

35 Claims, 6 Drawing Sheets

DISK DRIVE SEEK CONTROL SYSTEM UTILIZING PREDICTED MOTION PARAMETER AND DYNAMIC TRAJECTORY ALIGNMENT

FIELD OF THE INVENTION

The invention relates generally to data storage systems and, more particularly, to servo control systems for use therein.

BACKGROUND OF THE INVENTION

Disk drives are computer data storage devices that store data in a plurality of concentric tracks on the surface of a disk. A transducer, such as an inductive head, is used to both write data to said tracks and to read data from said tracks as the disk is rotated beneath the transducer. The transducer is moved over the surface of the disk using an actuator arm to support the head and some form of motor means, such as a voice coil motor (VCM), to impart motion to the actuator arm. A servo control system is implemented to control the motion created by the motor means.

Servo control systems generally perform two distinct functions: seek control and track following. The seek control function comprises controllably moving the transducer from a initial track position to a target track position. In this regard, the servo control system receives a command from a host computer that data is to be written to or read from a target track of the disk and the servo system proceeds to move the transducer to the target track from wherever it is currently located. Once the transducer is moved sufficiently near the target track, the track following function is activated to center and maintain the transducer on the target track until the desired data transfers are completed.

In making the transition between the seek function and the track following function, a settling period occurs during which the transducer converges on the center of the target track. It is not until after the settling period has ended that data transfer between the transducer and the target track can occur. As should be expected, the length of the settling period depends to a large extent on how accurately the seek routine has moved the transducer. In other words, if the transducer is very close to the center of the target track and has a very low velocity at the end of the seek cycle (i.e., the residual velocity and position of the transducer are low), the settling period will be relatively short.

Seek time is a measure of how fast, on average, a disk drive takes to move and settle a transducer over a target track after a command is received from a host computer to access the track. Because speed is a very important attribute in computer systems, seek time is generally used as an indicator of the quality or usefulness of a disk drive. Therefore, it is highly desirable to reduce the seek time of a disk drive as much as possible.

SUMMARY OF THE INVENTION

The present invention relates to a disk drive seek control system which is capable of rapidly moving a transducer from an initial position to a target position for use in reading/writing data to a desired data track. The system produces very little residual velocity/position at the end of the seek cycle, thereby reducing seek time considerably over past designs. In addition, the system is of relatively low complexity and cost and requires no calibration before operation resulting in a relatively low system startup time. Further, the system provides real time servo adaptation resulting in robustness to parameter variation and producing very consistent performance from drive to drive.

To achieve the above benefits, the system applies control to an actuator motor means based on predicted transducer velocity at a future servo sample time rather than velocity at a previous servo sample time. This allows the transducer to more closely track a desired velocity profile. Closer tracking of the velocity profile reduces position and/or velocity error at the end of the seek cycle and, therefore, reduces the length of time required for the transducer to settle on the target track of the disk. The system also utilizes dynamically adapted feed forward deceleration current during a deceleration portion of the seek function to further reduce velocity errors during this period and, therefore, to further reduce position/velocity errors at the end of the seek cycle.

DETAILED DESCRIPTION

The present invention relates to a disk drive seek control system which is capable of rapidly moving a transducer from an initial position to a target position above a data storage medium. The system applies control to an actuator motor means based on projected transducer velocity at a future servo sample time rather than velocity at a previous sample time. This allows the transducer to more closely track a desired velocity profile which, in turn, reduces residual position and/or velocity at the end of the seek cycle. Reduced position/velocity error reduces the length of time required for the transducer to settle on the target track of the disk. The system also utilizes dynamically adapted feed forward deceleration current during a deceleration portion of the seek function to reduce velocity errors during this period and, therefore, to further reduce residual position/velocity at the end of the seek function.

Figure 1:
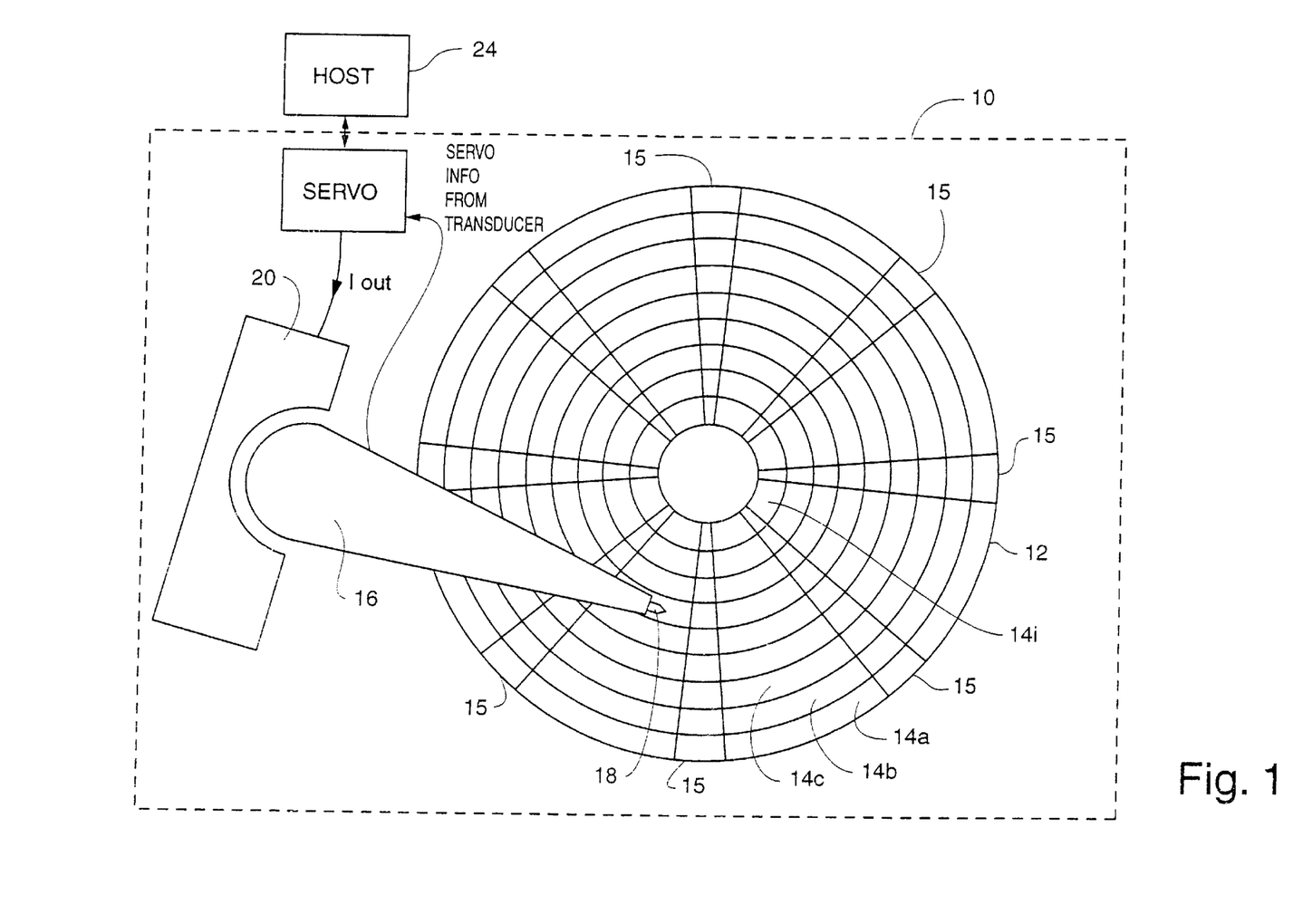
FIG. 1 is a diagram illustrating a disk drive system which may utilize the seek control system of the present invention.

FIG. 1 illustrates a disk drive system 10 which may utilize the seek system of the present invention. As illustrated, the disk drive system 10 includes: a data storage disk 12 rotating at a predetermined angular speed and having a plurality of substantially concentric tracks 14a–14i and a plurality of servo sectors 15 containing servo positioning information; an actuator arm 16 carrying a transducer 18; a voice coil motor (VCM) unit 20 mechanically coupled to the actuator arm 16; and a servo control unit 22. In accordance with one of its functions, the servo control unit 22 receives a request from a host computer 24 to move the transducer 18 to a target track on the disk 12 so that the host 24 can store data to the target track or retrieve data from the target track. Using feedback methods, the servo control unit 22 then delivers a current (i_out) to the VCM unit 20 to impart controlled rotational motion to the actuator 16 and transducer 18 to move the transducer 18 to the target track.

Figure 2:
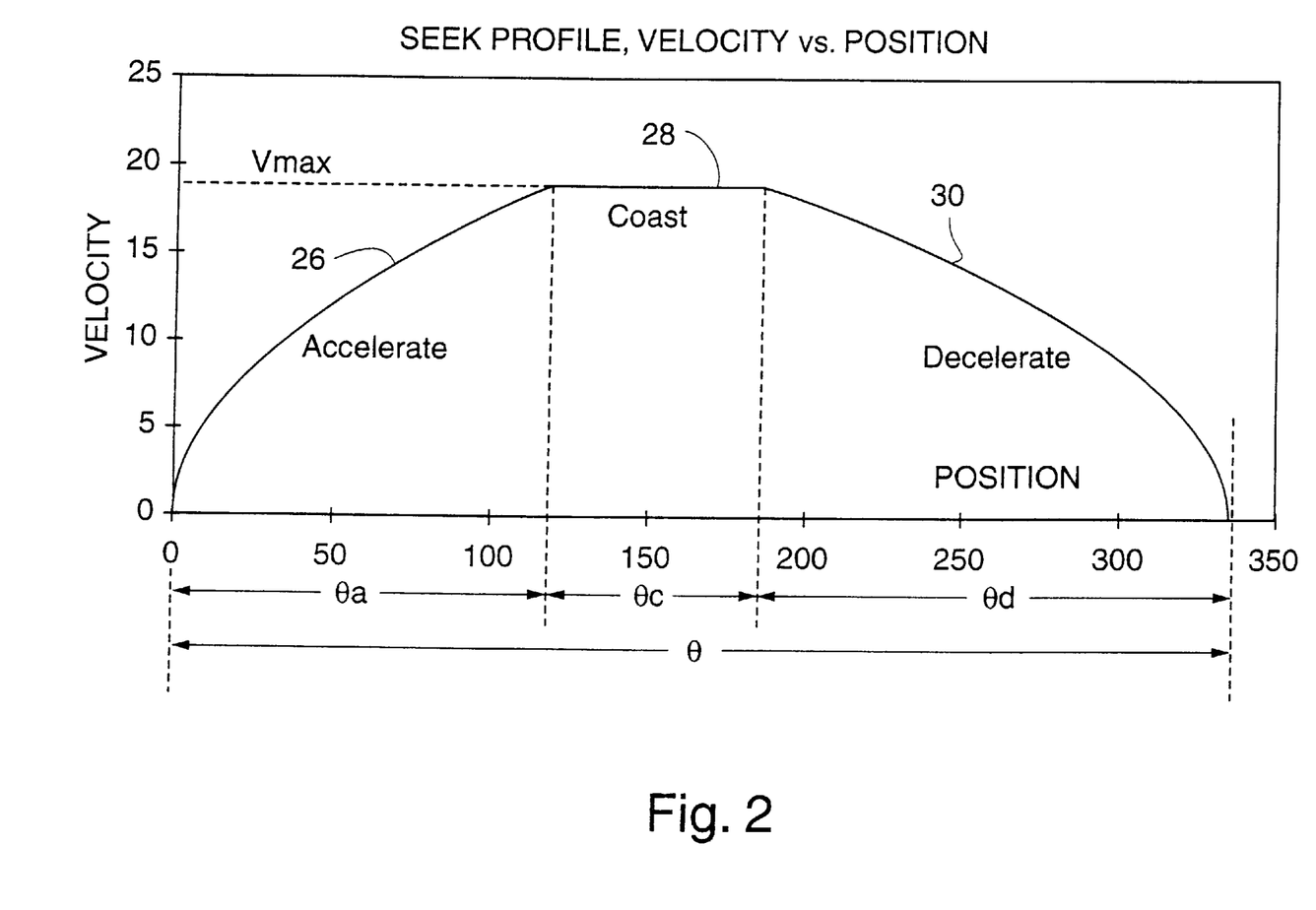
FIG. 2 is a graph illustrating a typical seek velocity profile used to move a transducer from an initial track position to a target track position.

The feedback used by the servo unit 22 is based on the difference between a measured transducer velocity and a desired transducer velocity at radial positions between the initial position of the transducer and the target position of the transducer. The servo unit 22 determines the desired transducer velocity for a particular transducer position by referring to a seek velocity profile which is set at the beginning of the seek cycle. The velocity profile may be calculated and stored at the beginning of the seek cycle or it may be embodied in an equation which is used throughout the seek cycle. FIG. 2 illustrates a typical seek velocity profile used to move a transducer from an initial track position to a target track position. As illustrated, the profile is divided into three distinct portions, namely: an acceleration portion 26, a coast portion 28, and a deceleration portion 30.

As the transducer 18 is moving across the surface of the rotating disk 12, the transducer 18 periodically samples the servo sectors 15 of the disk 12 and transfers the servo information to the servo control unit 22. The servo control unit 22 uses the servo samples to calculate the position and velocity of the transducer 18 at each of the servo sample times. Using the position and velocity information calculated from the servo samples and the velocity profile, the servo control unit 22 can bring the transducer to a stable position over the target track so that the desired data transfers can take place.

Motion of the transducer 18 in response to a current applied to the VCM is determined by certain mechanical properties of the actuator/transducer assembly; namely, the torque constant and inertia of the assembly. The angular acceleration of the actuator/transducer assembly, for example, is determined by the following equation:

$$a = K_t * i\_out / J_a = K_j * i\_out$$

where $K_t$ is the torque constant in Newton-meters/amp, $J_a$ is the inertia in gram-mm$^2$, i-out is the current applied to the VCM, and $K_j$ is a constant equal to $K_t/J_a$. Although the equation is linear, it should be appreciated that the current that may be applied to the VCM will have a maximum value based on design requirements and component limitations. This maximum VCM current will be referred to herein as maximum_i_out.

Figure 3:
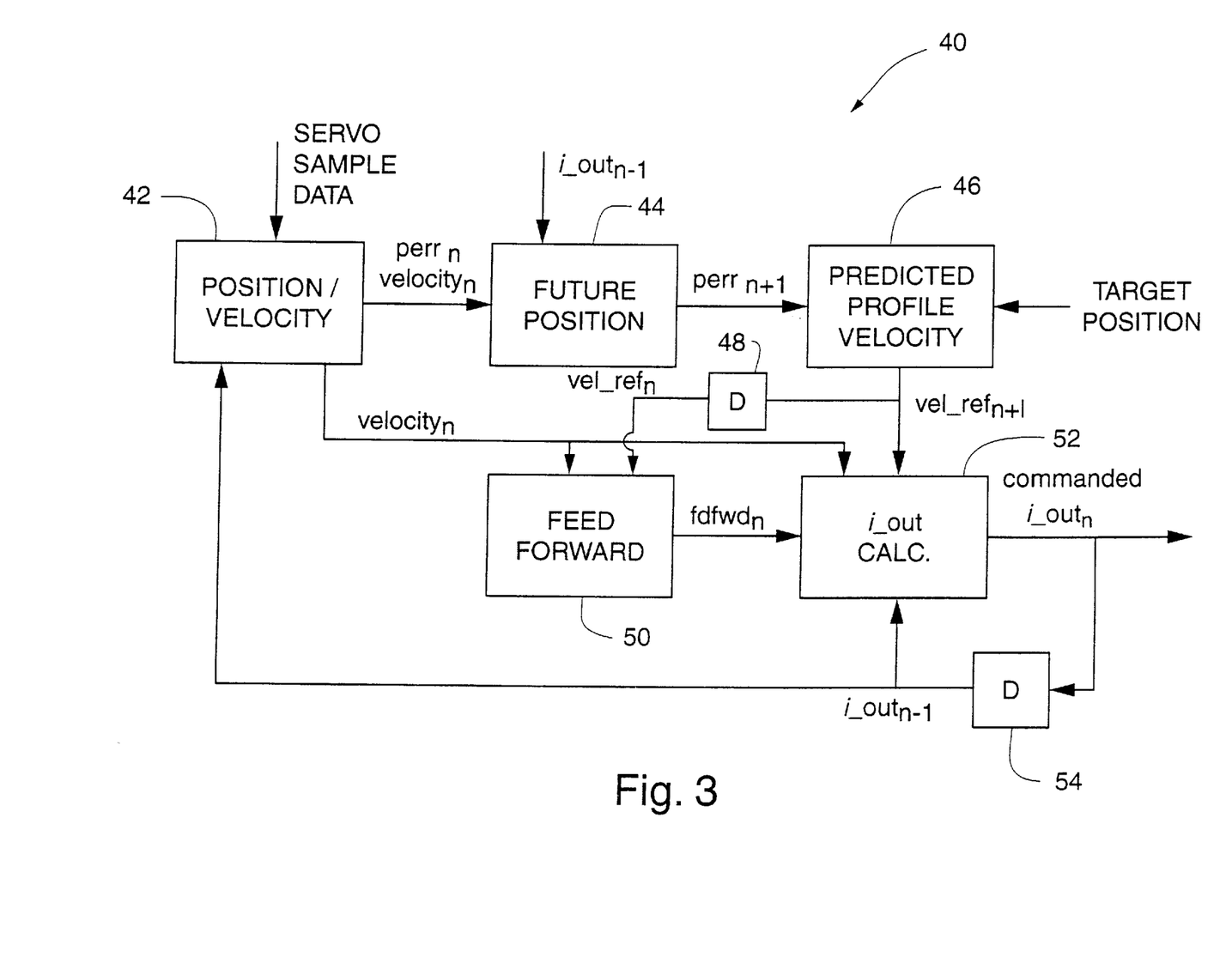
FIG. 3 is a block diagram of a seek control system in accordance with one embodiment of the present invention.

FIG. 3 is a block diagram illustrating a seek control system 40 in accordance with one embodiment of the present invention. The seek control system 40 may be implemented, for example, in the servo control unit 22 of FIG. 1. The system 40 includes: a position/velocity calculator (PVC) 42, a future position prediction unit (FPPU) 44, a predicted profile velocity unit (PPVU) 46, a first delay unit 48, a feed forward determination unit (FDU) 50, an i_out calculation unit 52 (ICU), and a second delay unit 54. The system 40 is operative for controlling the movement of the transducer 16 from an initial track position to a target track position over the disk 12. The system 40 receives servo sample information from the transducer and uses this information to continuously update a VCM current for rapidly moving the transducer to the target track. In accordance with one embodiment of the present invention, an update to the VCM current is not based on transducer position and velocity at a previous servo sample time, as in past systems, but is based on a predicted position and velocity at a future servo sample time.

Figure 4:
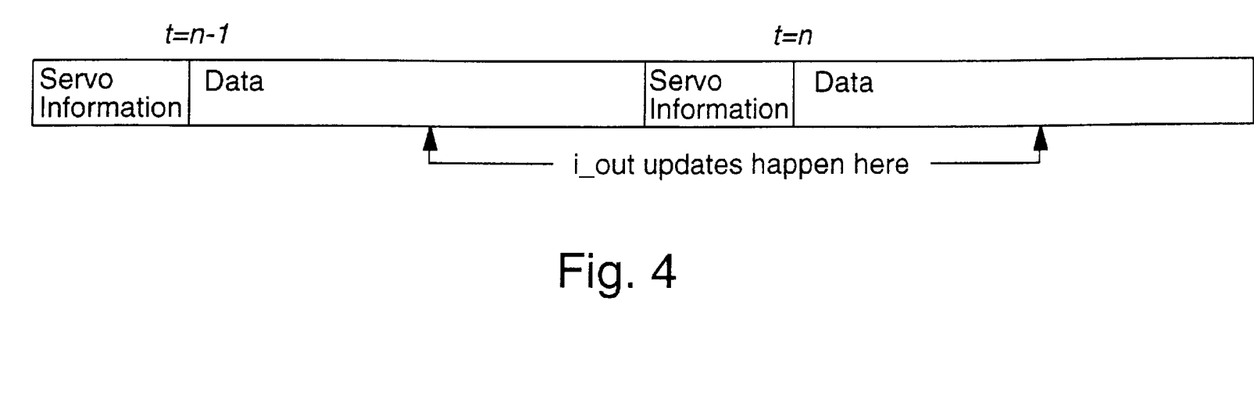
FIG. 4 is a diagram illustrating a typical delay in updating VCM current after a servo sample is taken.

In conceiving of the present invention, it was appreciated that there is an inherent delay involved in determining the position and velocity of the transducer after a servo sample is received. For example, there are delays associated with the analog to digital conversion of the servo position fields (A, B, C, and D) and with the calculation of transducer position using the converted position field information together with the servo sample gray code values. Because of these delays, updates to the VCM current based solely on the previous servo sample are applied well after the appropriate servo sample time (as illustrated in FIG. 4), thereby increasing the likelihood of velocity error. By predicting the position of the transducer at a future servo sample time in accordance with one embodiment of the present invention, the VCM current can be updated before the corresponding servo sector is reached so that the transducer is moving at the desired profile velocity when the next servo sample occurs, thereby significantly reducing velocity error caused by calculation delay.

With reference to FIG. 3, the PVC 42 receives a servo sample from the transducer 18 and uses the information contained therein to determine the transducer position error relative to the target track ($Perr_n$) and angular velocity of the transducer 18 ($velocity_n$) at the most recent servo sample time. It should be understood that, as used herein, the symbol n will indicate a most recent servo sample time, n−1 a next most recent servo sample time, and n+1 the next servo sample time. The FPPU 44 receives the $Perr_n$ and $velocity_n$ values from the PVC 42 and uses these values, along with a VCM current value corresponding to a next most recent servo sample time ($i\_out_{n-1}$), to predict the transducer position error at a future servo sample time ($Perr_{n+1}$(predicted)). $Perr_{n+1}$(predicted) is then delivered to the PPVU 46 which calculates the desired profile velocity ($vel\_ref_{n+1}$(predicted)) at the transducer position corresponding to $Perr_{n+1}$.

The first delay unit 48 receives the $vel\_ref_{n+1}$(predicted) value from the output of the PPVU 46 and delays the value by one servo sample interval (i.e., the time between consecutive servo samples). The output of the first delay unit 48, therefore, represents the predicted profile velocity corresponding to the most recent servo sample ($vel\_ref_n$(predicted)). The FDU 50 receives the $vel\_ref_n$(predicted) value from the first delay unit 48 and the $velocity_n$ value from the PVC 42 and uses these values to update a feed forward deceleration current ($fdfwd_n$) used in the calculation of the updated VCM current.

The ICU 52 is operative for updating the VCM current, in response to numerous inputs, to produce an output current signal, $i\_out_n$. One of the inputs into the ICU 52 comprises a feedback signal from the output of the ICU 52. The second delay unit 54 receives the $i\_out_n$ signal from the ICU 52, delays it by one servo sample interval, and feeds the delayed value back to the ICU 52. The feedback value, therefore, represents the commanded VCM current corresponding to the next most recent servo sample time ($i\_out_{n-1}$). In addition, the ICU 52 receives the $fdfwd_n$ value from the FDU 50, the $velocity_n$ value from the PVC 42, and the $vel\_ref_{n+1}$ value from the PPVU 46. The ICU 52 uses all of these input values to calculate the updated VCM current ($i\_out_n$).

The PVC 42 calculates the position error, $Perr_n$, by determining the radial position of the transducer at the most recent servo sample time, using the servo sample information, and finding the difference between that value and the position of the target track. The PVC 42 also includes means, such as a state estimator, for calculating the actual velocity of the transducer at the most recent servo sample time using the servo sample information.

The FPPU 44 predicts the position of the transducer at the next servo sample time using well known laws of motion. For example, the following equation can be used to determine the position of a moving body at a given time:

$$\text{Position} = P_0 + V_0 t + \tfrac{1}{2} a t^2$$

where Po is the initial position of the body, Vo is the initial velocity of the body, a is the constant acceleration of the body, and t is the elapsed time. Applying this equation to the motion of the transducer results in the following equation:

$$\text{Perr}_{n+1} = \text{Perr}_n + \text{velocity}_n + \tfrac{1}{2} a t^2$$

where $\text{Perr}_{n+1}$ is the position error at the next servo sample time, $\text{Perr}_n$ is the position error at the most recent servo sample time, $\text{velocity}_n$ is the velocity of the transducer at the most recent servo sample time, and a is the acceleration of the transducer. As described above, the acceleration of the transducer will be, in general, a linear function of the current applied to the VCM. Because the VCM current will be updated some time between the most recent servo sample time and the next servo sample time, an exact solution requires that the above equation be bifurcated into two equations corresponding to the two current values. However, at the time of this calculation, the VCM current has not yet been updated for this servo sample period and, therefore, the current in the second portion of the servo sample period is not known. Therefore, in accordance with the present invention, an approximation is made based on the fact that the VCM current does not generally change significantly from sample to sample. In this regard, the VCM current at the most recent servo sample time is used for the entire period between the most recent servo sample time and the next servo sample time to solve the above equation.

Figure 5:
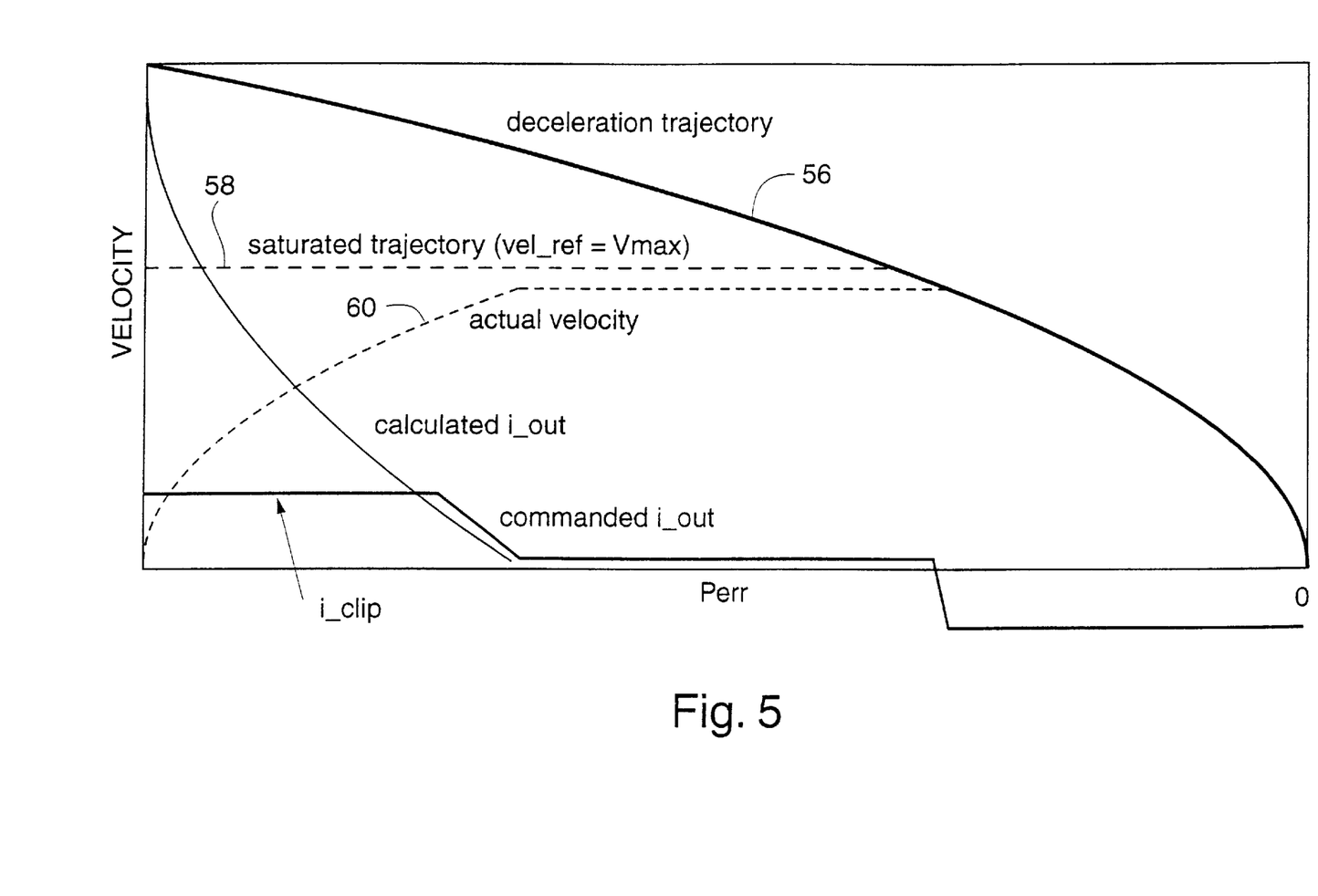
FIG. 5 is a graph illustrating the operational characteristics of a seek control system in accordance with one embodiment of the present invention.

The PPVU 46 receives the predicted position error value from the FPPU 44 and uses it to determine the velocity profile value at the predicted position. In accordance with one embodiment of the present invention, a single deceleration trajectory is determined upon which the velocity profile is based. The deceleration trajectory is defined by the following equation:

$$\text{trajectory} = \sqrt{(2a)} * \sqrt{(\text{Perr})}$$

wherein $\sqrt{(2a)}$ is a constant which defines the aggressiveness of the deceleration trajectory and $\sqrt{(\text{Perr})}$ is the square root of the position error with respect to the target track. FIG. 5 illustrates the deceleration trajectory 56 for a typical seek in accordance with one embodiment of the present invention.

The acceleration value used to calculate $\sqrt{(2a)}$ is generally based on a fixed percentage of the maximum VCM current. For example, in one embodiment of the present invention, the nominal value of $\sqrt{(2a)}$ is:

$$\sqrt{(2a)} = \sqrt{(2*0.8*\text{maximum}\_i\_\text{out}*Kt/Ja)}$$

The VCM current value used to calculate $\sqrt{(2a)}$ is made less than the maximum VCM current to provide some headroom in the VCM current so that control can be maintained regardless of mechanical or electronic variations from drive to drive. In addition, the nominal value of $\sqrt{(2a)}$ used during shorter seeks may be derated (i.e., trajectory made less aggressive) to allow more time for the seek system to correct for velocity errors during the shorter seeks. For example, FIG. 5 illustrates a typical $\sqrt{(2a)}$ derating for seek lengths less than 400 cylinders (which, in practice, will be an experimentally derived value). The PPVU 46 uses the above trajectory equation to calculate the predicted profile velocity at the next servo sample time (vel_ref$_{n+1}$). If the calculated value is greater than a maximum velocity value ($V_{max}$), however, vel_ref$_{n+1}$ is made equal to $V_{max}$.

Feed forward deceleration current is a current component which is combined with the VCM current to ensure steady deceleration of the transducer. If feed forward deceleration current is not used, the deceleration of the transducer is based solely on the difference between the desired profile velocity and measured velocity of the transducer. This leads to a situation where the actual deceleration of the transducer lags behind the velocity profile. The feed forward deceleration current adds an extra amount of deceleration to the transducer during each servo sample interval so that the deceleration more closely follows the velocity profile.

In past seek systems, feed forward deceleration current, if used, is a fixed value. The fixed value can be a preprogrammed constant or can be determined during a time consuming calibration procedure that is periodically performed on the drive. Because the optimal feed forward current value can change with time, temperature, and/or supply voltage, the use of a preprogrammed constant or a calibration procedure can result in the utilization of non-optimal feed forward values which can significantly increase velocity errors during the seek cycle. In addition, a single fixed feed forward deceleration current value is generally incapable of compensating accurately for different mechanical characteristics at different track locations.

In accordance with the present invention, the feed forward deceleration current is dynamically adjusted during the deceleration portion of the seek cycle so that the velocity of the transducer more closely follows the velocity profile. In this way, optimal feed forward current values are always used and velocity error is reduced during deceleration. This is important because even a small velocity error can result in a large residual position/velocity at the end of the deceleration portion of the seek cycle which will increase the time required to settle on the target track. Further, the feed forward deceleration current may be implemented during the entire seek cycle, not just the deceleration portion. This results in smooth transitions between acceleration, coasting, and deceleration with no spikes in the current which may result in noisy disk drive operation and velocity errors.

Figure 6:
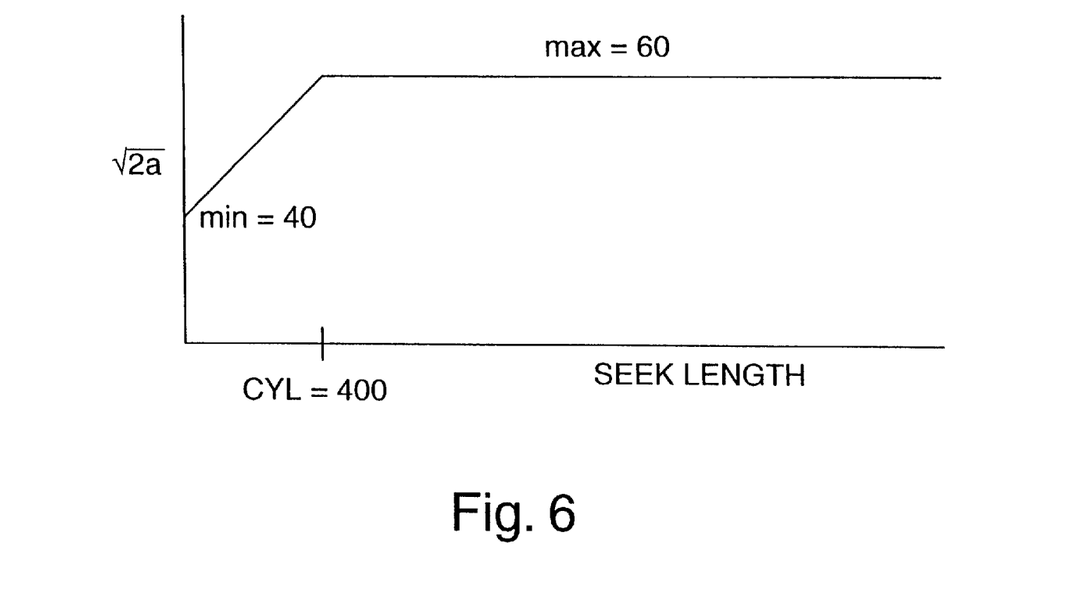
FIG. 6 is a graph illustrating the derating of a $\sqrt{(2a)}$ parameter in accordance with one embodiment of the present invention.

In one embodiment of the present invention, a nominal feed forward deceleration current is set before the seek cycle begins. If the value of $\sqrt{(2a)}$ has been derated, as previously mentioned with respect to FIG. 6, then the nominal feed forward deceleration current is similarly derated. The FDU 50 dynamically adjusts the nominal feed forward deceleration current based on the difference between the measured velocity at the most recent servo sample time (velocity$_n$) and the vel_ref$_n$(predicted) value from the first delay unit 48. The FDU 50 only performs this adaptation, however, if the measured velocity at the most recent servo sample time (velocity$_n$) is less than the measured velocity at the next most recent servo sample time by more than a predetermined amount (i.e., 0.5 tracks/sample in one embodiment). This requirement ensures that the adjustment of the feed forward deceleration value will only be done during the deceleration portion of the seek cycle. The FDU 50 adjusts the feed forward deceleration current according to the following equation:

$$fdfwd_n = fdfwd_{n-1} + A*(velocity_n - vel\_refn(predicted))$$

wherein $fdfwd_n$ is the updated feed forward value, $fdfwd_{n-1}$ is the previous feed forward value, and A is a predetermined scaling value based on system requirements and experimental data. Adapting the feed forward value proportionally to the velocity error results in very rapid adapting, i.e., the deceleration current and the adapted feed forward value will generally stabilize to approximately a constant value within several servo samples during deceleration.

Figure 7:
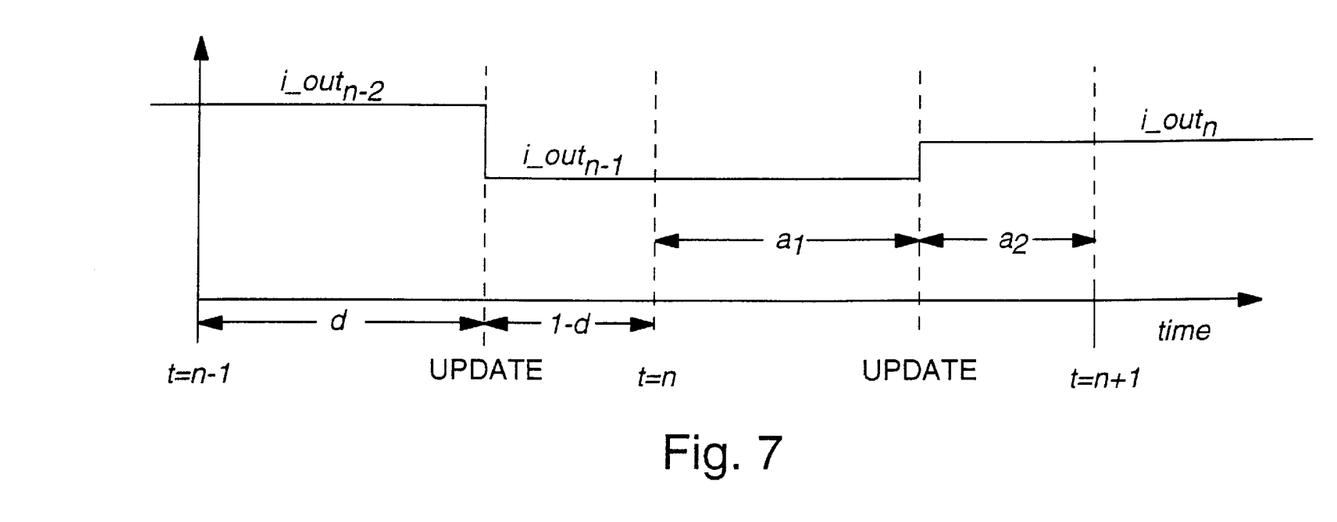
FIG. 7 is a graph illustrating the timing of VCM current updates in accordance with one embodiment of the present invention.

FIG. 7 is a timing diagram illustrating typical current updates in accordance with the present invention. The times t=n−1, n, and n+1 indicate the instants at which servo sample information is read from the disk using the transducer. As illustrated in FIG. 7, a delay exists between the time the servo sample information is read and the time the VCM current is updated. During this delay period, the ICU calculates the updated currents based on the predicted position of the transducer at the next servo sample time. The equation used by the ICU 52 in one embodiment of the present invention is developed below.

The ICU 52 calculates the updated VCM current value ($i\_out_n$) using the $i\_out_{n-1}$, $fdfwd_n$, $velocity_n$, and $vel\_ref_{n+1}$ values. To do this, the ICU 52 implements a proportional velocity control loop based on the following equation:

$$i\_out_n = K_{vel}*(velocity_{n+1} - vel\_ref_{n+1}) + fdfwd_n$$

where $K_{vel}$ is the velocity loop proportional gain and $velocity_{n+1}$ is a predicted velocity at the next servo sample time. To determine the value of $velocity_{n+1}$, the following basic law of motion is used:

$$velocity_{n+1} = velocity_n + at$$

As described above, the acceleration of the transducer will be approximately proportional to the current applied to the VCM. Therefore, because the VCM current will be updated part way between the most recent servo sample time and the next servo sample time, the acceleration element in the above equation must be bifurcated as follows:

$$velocity_{n+1} = velocity_n + a_1*d + a_2*(1-d) = velocity_n + K_j*d*i\_out_{n-1} - K_j*(1-d)*i\_out_n$$

where $a_1$ represents acceleration during a first portion of the current servo sample interval, $a_2$ represents acceleration during a second portion of the current servo sample interval, and d represents the delay in the update of the VCM current value as a fraction of the servo sample interval. Substituting the above equation into the velocity control equation and solving for $i\_out_n$ results in the following equation:

$$i\_out_n = \frac{K_{vel}*(velocity_n - vel\_ref_{n+1} - K_j*d*i\_out_{n-1}) + fdfwd_n}{1 + K_{vel}*K_j*(1-d)}$$

This is the equation implemented by the ICU 52.

Figure 8:
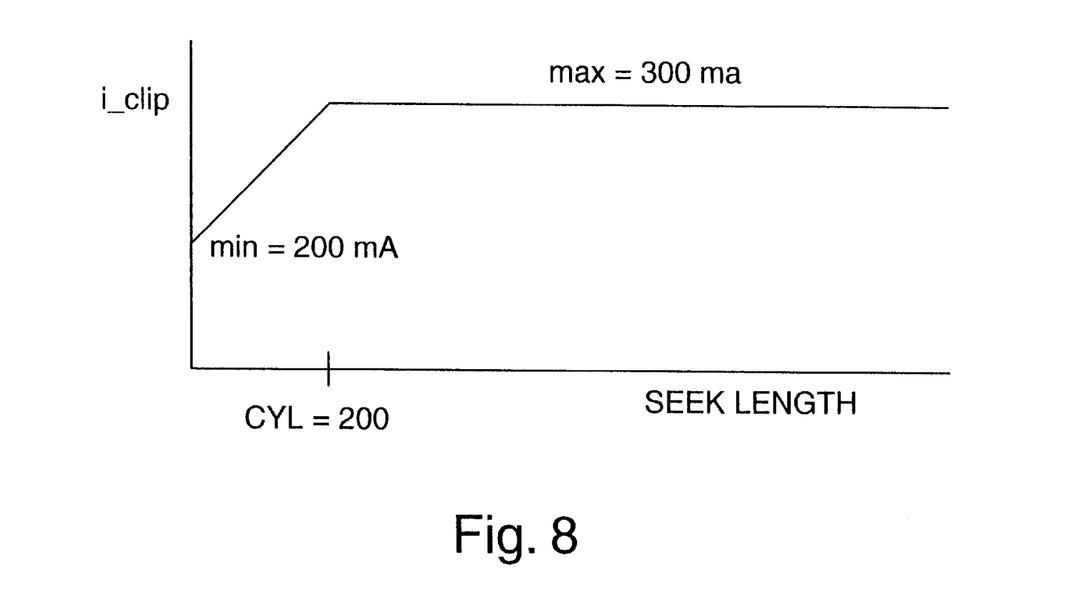
FIG. 8 is a graph illustrating the derating of an i_clip parameter in accordance with one embodiment of the present invention.

FIG. 5 illustrates the operational characteristics of one embodiment of the present invention. As illustrated, a deceleration trajectory 56 is calculated based on distance from the target track (i.e., Perr). As described previously, the calculated trajectory 56 is truncated by a saturated trajectory portion 58 when the calculated trajectory 56 exceeds a maximum velocity $V_{max}$. The VCM current is calculated based on the difference between the composite trajectory (i.e., saturated portion+calculated portion) and the predicted velocity information ($velocity_{n+1}$) using the above equation. As illustrated in FIG. 5, the calculated VCM current is very large at the beginning of the seek cycle due to the large difference between the actual velocity 60 and the saturated trajectory velocity (i.e., $V_{max}$) This calculated current is too large to apply to the VCM and must therefore be limited. In this regard, a maximum acceleration current (i_clip) is specified at the beginning of the seek cycle and the current sent to the VCM (commanded i_out) is not permitted to exceed this value. As illustrated in FIG. 8, the value of i_clip may be derated based on seek length, similarly to the $\sqrt{(2a)}$ value described earlier.

As the actual velocity approaches $V_{max}$, the velocity error, and hence the calculated i_out value, become small and eventually reach substantially constant values. The resulting i-out value is enough to maintain a constant transducer velocity during the coast portion of the seek cycle.

The coast portion continues until the value of the deceleration trajectory 56 falls below $V_{max}$, after which the transducer begins to decelerate. The feed forward deceleration current will begin to adapt as described previously and the actual velocity of the transducer will track the calculated trajectory very closely. At the time the transducer reaches the target track, there will be very little residual velocity which significantly reduces the time required for settling.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A disk drive seek control system for changing the position of a transducer relative to a rotating storage disk from an initial position to a target position, said system comprising:

a storage disk having a plurality of concentric tracks for storing data;

a spindle motor for rotating said storage disk at a substantially constant angular velocity;

a transducer for reading data from a track of said storage disk;

a voice coil motor for moving said transducer relative to said storage disk in response to a control signal; and a controller for generating said control signal and for delivering said control signal to said voice coil motor so that said transducer moves in a direction from said initial position to said target position, wherein said controller predicts a value of a motion related parameter of said transducer for a predetermined future instant in time, wherein said controller uses said predicted value to generate said control signal, and wherein said control signal is applied to said voice coil motor before said predetermined future instant in time is reached.

2. The system, as claimed in claim 1, wherein;

said controller predicts a value of a velocity of said transducer that is to occur at said predetermined future instant in time.

3. The system, as claimed in claim 2, wherein:

said controller predicts said value of said velocity of said transducer using a physical law of motion.

4. The system, as claimed in claim 3, wherein:

said physical law of motion includes the following:

$$velocity = V_0 + at$$

where velocity is the velocity of a moving body at time t, $V_0$ is the velocity of the body at time t=0, and a is the constant acceleration of the body.

5. The system, as claimed in claim 2, wherein:

said controller determines a desired velocity profile for said transducer, said desired velocity profile being a function of radial transducer position between said initial position and said target position, wherein said determination of said desired velocity profile is different from said prediction of said value of said velocity of said transducer that is to occur at said predetermined future instant in time.

6. The system, as claimed in claim 1, wherein:

said motion related parameter includes radial position of said transducer.

7. The system, as claimed in claim 6, wherein:

said prediction of said radial position includes the use of the following physical law of motion:

$$\text{Position} = P_0 + V_0 t + \tfrac{1}{2} a t^2$$

where Position is a position of a moving body at a time t, $P_0$ is a position of the body at time t=0, $V_0$ is a velocity of the body at time t=0, and a is a constant acceleration of the body.

8. The system, as claimed in claim 6, wherein:

said controller predicts said radial position using transducer velocity and position information corresponding to a previous instant in time.

9. The system, as claimed in claim 6, wherein:

said predicted radial position is different from said target position.

10. The system, as claimed in claim 1, wherein:

said controller predicts both a value of a velocity of said transducer at said predetermined future instant in time and a radial position of said transducer at said predetermined future instant in time; and said controller modifies said control signal before said control signal is delivered to said voice coil motor based on a difference between a desired velocity at said predicted radial position and said predicted velocity value at said predetermined future instant in time.

11. The system, as claimed in claim 1, wherein:

said storage disk includes a plurality of servo sectors each containing servo positioning information; and said controller samples said servo sectors as said transducer moves from said initial position to said target position, each servo sample occurring at a corresponding servo sample time.

12. The system, as claimed in claim 11, wherein:

said predetermined future instant in time includes a future servo sample time.

13. The system, as claimed in claim 12, wherein:

said future servo sample time includes a next servo sample time.

14. The system, as claimed in claim 13, wherein:

said controller predicts a radial position of said transducer at said next servo sample time based on the following equation:

$$\text{Perr}_{n+1} = \text{Perr}_n + \text{velocity}_n t + \tfrac{1}{2} a t^2$$

where $\text{Perr}_{n+1}$ the radial position of said transducer at said next servo sample time, $\text{Perr}_n$ represents the radial position of said transducer at a most recent servo sample time, $\text{velocity}_n$ is a measured velocity of said transducer at said most recent servo sample time, a is an acceleration of said transducer between said most recent servo sample time and said next servo sample time, and t represents a time interval between said most recent servo sample time and said next servo sample time.

15. The system, as claimed in claim 14, wherein:

said acceleration of said transducer is substantially proportional to said control signal delivered to said voice coil motor; and said controller modifies said control signal at least once during the period between said most recent servo sample time and said next servo sample time, thereby modifying said acceleration during said period.

16. The system, as claimed in claim 15, wherein:

said controller predicts a radial position using a value of said acceleration corresponding to said most recent servo sample time as an approximation for said acceleration during the entire period between said most recent servo sample time and said next servo sample time in solving said equation.

17. The system, as claimed in claimed 1, wherein:

said controller dynamically adjusts said feed forward component based on a difference between a desired transducer velocity and an actual transducer velocity.

18. The system, as claimed in claim 1, wherein:

said controller determines a feed forward component for use in decelerating said transducer as said transducer approaches said target track and dynamically adjusts said feed forward component as said transducer decelerates.

19. An apparatus for controlling the radial movement of a transducer relative to a rotating storage medium in a disk drive from an initial position to a target position, wherein said rotating storage medium includes a plurality of concentric tracks each capable of storing user information, said apparatus comprising:

means for determining a desired velocity for said transducer at radial positions between said initial position and said target position;

means for predicting a radial position of said transducer at a predetermined future instant in time, wherein said radial position is different from said target position;

means for predicting a future velocity of said transducer at said predetermined future instant in time; and means for adjusting the velocity of said transducer, based on said predicted future velocity and said desired velocity at said predicted radial position, prior to reaching said predetermined future instant in time.

20. The apparatus, as claimed in claim 19, wherein:

said rotating storage medium includes a plurality of servo sectors each containing servo positioning information; and a means for generating comprising means for sampling said servo sectors as said transducer moves from said initial position to said target position, each servo sample occurring at a corresponding servo sample time.

21. The apparatus, as claimed in claim 20, wherein:

said predetermined future instant in time includes a next servo sample time.

22. An apparatus for controlling the radial movement of a transducer relative to a rotating storage medium in a disk drive from an initial position to a target position, said apparatus comprising:

a storage disk having a plurality of concentric tracks for storing data;

means for rotating said storage disk at a substantially constant angular velocity;

transducer means for reading data from a track of said storage disk;

means for determining a desired velocity for said transducer at radial positions between said initial position and said target position;

means for imparting motion to said transducer means, said means for imparting motion including means for adjusting radial transducer velocity, in response to a control signal, using a feed forward deceleration value, wherein said feed forward deceleration value is added to said control signal to provide steady deceleration of said transducer prior to reaching said target track; and means for adjusting said feed forward deceleration value as said transducer moves from said initial position to said target position, wherein said means for adjusting the feed forward deceleration value is based on an actual velocity of the transducer.

23. The apparatus, as claimed in claim 22, wherein:

said means for adjusting radial transducer velocity includes means for adjusting velocity using a difference between an actual transducer velocity and a desired transducer velocity at a first transducer position.

24. The apparatus, as claimed in claim 22, wherein said means for adjusting radial transducer velocity includes means for adjusting velocity using a difference between a predicted transducer velocity at a first transducer position and a desired transducer velocity at said first transducer position.

25. The apparatus, as claimed in claim 24, wherein:

said desired transducer velocity is a desired velocity at a predicted radial position at said future instant in time.

26. The apparatus, as claimed in claim 22, wherein:

said means for adjusting includes means for adjusting said feed forward deceleration value based on a difference between an actual transducer velocity and a desired transducer velocity.

27. The apparatus, as claimed in claim 26, wherein:

said actual transducer velocity is a velocity corresponding to a previous instant in time.

28. The apparatus, as claimed in claim 27, wherein:

said desired velocity is a desired velocity at said previous instant in time.

29. In a disk drive system, a method for use in changing the radial position of a transducer relative to a rotating storage medium from an initial position to a target position, wherein said rotating storage medium includes a plurality of concentric tracks each capable of storing user information, said method comprising the steps of:

determining a desired velocity profile for said transducer as a function of radial position of said transducer, said velocity profile including an acceleration portion and a deceleration portion;

initiating movement of said transducer from said initial position toward said target position;

determining an actual velocity of said transducer at multiple radial transducer positions during the movement of said transducer from said initial position to said target position;

adjusting the velocity of said transducer based on a combination of a predetermined deceleration feed forward value and a difference between said actual velocity of said transducer and a velocity profile value at said multiple radial transducer positions; and dynamically adjusting said predetermined deceleration feed forward value based on an actual velocity of the transducer during the movement of said transducer from said initial position to said target position.

30. The method of claim 29, wherein:

said step of dynamically adjusting includes the step of adjusting based on an actual transducer velocity at a predetermined instant in time and a desired transducer velocity at said predetermined instant in time in accordance with said velocity profile.

31. The method of claim 30, wherein:

said predetermined instant in time includes a most recent servo sample time.

32. The method of claim 29, wherein:

said step of dynamically adjusting is only performed when a transducer velocity at a first instant in time is greater than a transducer velocity at a second, subsequent instant in time by more than a predetermined amount.

33. The method of claim 32, wherein:

said first instant corresponds to a next most recent servo sample time.

34. The method of claim 33, wherein:

said second instant corresponds to a most recent servo sample time.

35. The method of claim 29, wherein:

said step of dynamically adjusting is only performed during said deceleration portion of said velocity profile.

* * * * *

UNITED STATES PATENT AND TRADEMARK OFFICE
CERTIFICATE OF CORRECTION

PATENT NO. : 6,125,000
DATED : September 26, 2000
INVENTOR(S) : Carlson, et al.

It is certified that error appears in the above-indentified patent and that said Letters Patent is hereby corrected as shown below:

In the Claims:
    In claim 14, column 9, line 63, prior to the word "the", insert the word --represents--

In claim 17, column 10, line 20, delete the number "1" and insert the number --18-- therefor Signed and Sealed this Twenty-second Day of May, 2001

*Attest:*

NICHOLAS P. GODICI

*Attesting Officer*      *Acting Director of the United States Patent and Trademark Office*